United States Patent Office 3,501,888
Patented Mar. 24, 1970

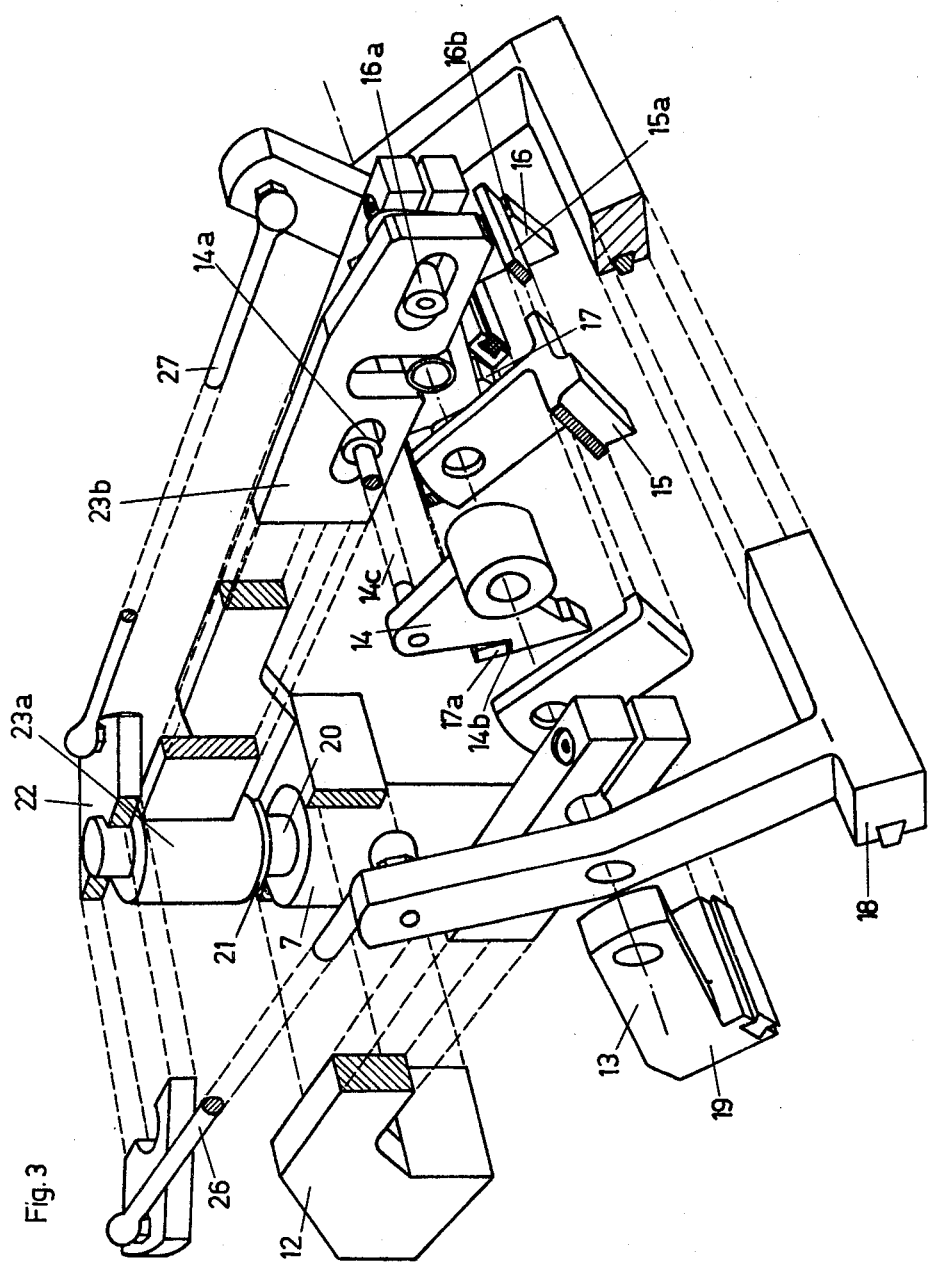

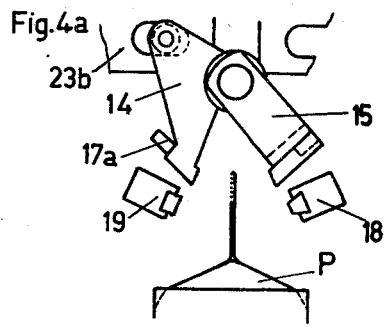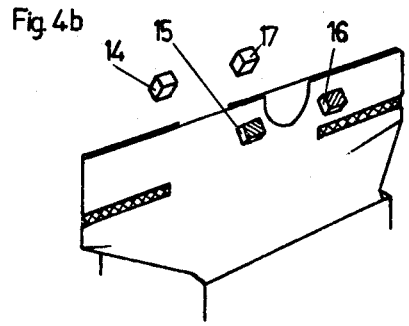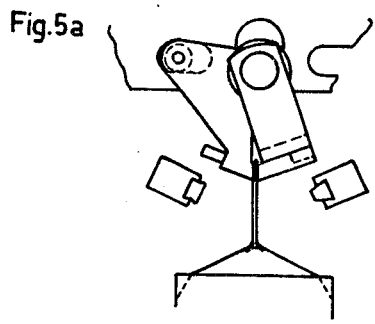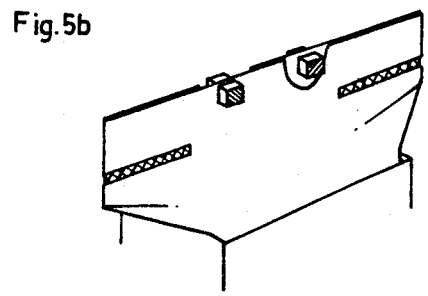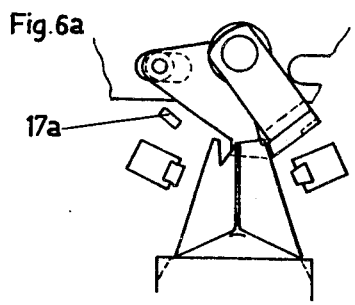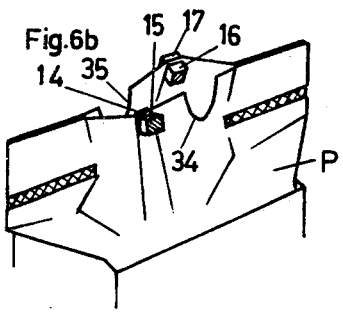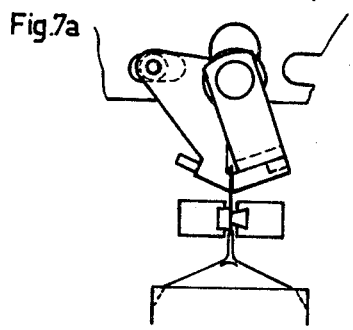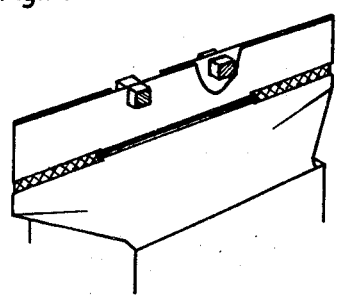

3,501,888
DEVICES FOR EVACUATING AND/OR FILLING WITH GAS AND SEALING SHUT FILLED CONTAINERS
Alwin Egli, Zurich, and Theo Rothenbach, Schaffhausen, Switzerland, assignors to Schweizerische Industrie-Gesellschaft, Neuhausen am Rheinfall, Switzerland
Filed Nov. 30, 1967, Ser. No. 686,908
Claims priority, application Switzerland, Dec. 5, 1966, 17,355/66
Int. Cl. B65b *31/02*
U.S. Cl. 53—86       14 Claims

ABSTRACT OF THE DISCLOSURE

Two pairs of spreaders and counter members grasp the opposed sides of the bag and spread them apart, to permit the gas to enter the bag. The bag is then closed and sealed shut by a welding die and counter member. The spreaders, welding die, and associated counter members are automatically controlled during rotation of the turntable, on which the bags are set under a hood, by cam tracks.

BACKGROUND OF THE INVENTION

The invention pertains to devices for evacuating of air and/or filling with a protective gas and sealing shut upright, filled bags or sacks made of a material that can be welded shut, in a chamber that can be evacuated and filled with a protective gas.

As a rule, filled bags or sacks can be satisfactorily evacuated of air in a closed chamber, but difficulties often arise when subsequently filling the bags with gas. During this latter procedure gas is fed to the chamber via a conduit. The pressure in the chamber rises, of course, somewhat faster than it does in the bag, which customarily incorporates only a small opening through which the gas enters the bag. As a consequence of the lower pressure in the bag, the end of the bag having the opening collapses and may even completely cutoff the flow of gas into the interior of the bag. It is thus impossible to assure that the bag is dependably filled with gas during the short time that is available during this procedure. Even in those instances where the pressures in the bag and in the chamber are equal, the collapsed end of the bag frequently does not completely erect itself, and thus lies outside of the operating zone of the welding die, which must seal the bag shut before the chamber can be opened.

Various suggestions have been advanced for avoiding these difficulties. It has been proposed, for example, that the mouth of the bag, before the bag is placed in the chamber, be partly pre-welded, so that only lateral ducts remain open for the gas. It has been observed, however, that, when the material of the bag is insufficiently stiff, the ducts close during the gassing procedure, because their small diameter results in a high gas speed in the ducts, causing the duct walls to be sucked together.

Another proposal avoids pre-welding of the mouth of the bag. A gas-supply pipe extends along the entire length of the bag mouth. A stream of gas is directed into the bag from a longitudinal slot, or from a series of individual holes, in the pipe. This scheme is also accompanied by local high-speeds of the gas entering the bag and the consequent risk that the mouth will collapse and cutoff the gas flow. Moreover, the stream of gas, which is directed into the interior of the bag, can stir up the bag's contents and contaminate the interior of the chamber.

SUMMARY

The purpose of the invention is mechanical means for positively holding open the mouth of the bag during the time that the bag is filled with a gas.

BRIEF DESCRIPTION OF THE DRAWING

The invention will now be described in detail, with reference to the figures in the accompanying drawing, wherein:

FIG. 3 is a perspective, partly exploded, view of the spreaders, welding die, and associated counter members;

FIGS. 4a and 4b to 7a and 7b show diagrammatically the successive positions of the spreaders, welding die, and associated counter members during operation.

DESCRIPTION OF THE PREFERRED EMBODIMENT

Figure 1:
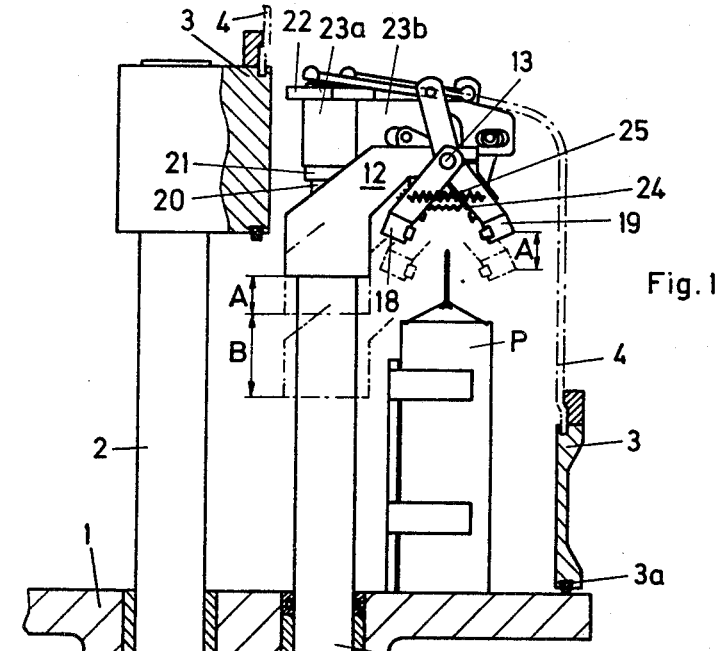
FIG. 1 is a side view in cross section of a turntable fitted with the invention.

With reference to FIG. 1, a plurality of hoods 4 are arranged in a known manner on a turntable 1. Each hood can hold a single, filled container P, such as a bag or sack, which is to be evacuated of air and/or filled with a neutral protective gas, such as nitrogen, and finally sealed by welding shut the transverse seam on the mouth of the container. FIG. 1 shows in vertical cross section one of the hoods 4 and associated hood support 3, the two of which together with the turntable 1 form a gas-tight chamber. The hood carrier 3 is mounted on a rod 2 which is vertically movable in the turntable 1. The lower end of the rod carries a wheel 6 that engages a cam track 5. By means of this cam track and the rotation of the turntable, the hood carrier 3 is first raised; then, after the container P has been set in position, lowered to the welding position, where the sealing strip 3a forms a seal with the top surface of the turntable; and finally, after evacuation, filling with gas, and welding, again raised. In FIG. 1 the rod 2, and thus the corresponding hood 4, is shown in the raised position, whereas the right hand portion of the figure shows the hood 4 and carrier 3 lowered, forming a closed, gas-tight chamber with the turntable 1. Pieces of filler are advantageously mounted in the space under a hood in order to reduce the dead space and thereby the amount of gas that is used. A hollow rod 7 is slidably mounted in the turntable 1. The upper end of the rod mounts a welding-head holder 12. On the lower end of the rod 7 is rigidly held a collar 8 that supports a wheel 10 which runs in a cam track 11a (when the turntable 1 rotates) in a cam-track carrier 11 which is adjustable as to its vertical position but otherwise remains stationary. Within the hollow rod 7 is located a drive shaft 20 which is free to slide up and down and to pivot. The lower end of the drive shaft carries a collar 28 which supports a wheel 29 that engages a cam track 11b of the cam-track carrier 11. Each of the collars 8 and 28 is prevented from twisting by a groove 9 in the turntable 1. The collars project into the groove. As will be later explained, the collar 8, anchored firmly to the rod 7, and the collar 28, anchored to the drive shaft 20, respectively cause the rod and drive shaft to rise and fall. In addition to a vertical movement the drive shaft is also caused to pivot by a cam surface 33 on the cam-track carrier 11. A bushing 32, carried by an arm 31b of a lever 31 projecting from a collar 31a clamped on the drive shaft 20, engages the cam surface 33. The shaft 20 is free to pivot in the collar 28, the latter being held stationary with respect to the former by a set collar 30. The upper ends of the hollow rod 7 and drive shaft 20, as well as the spreading jaws and the welding die mounted on them, are shown in FIG. 3. The welding-head holder 12 carries an axle 13, which is shown in FIG. 3 only as a dot-dash line that defines the axis. Mounted on the axle are the spreaders (or jaws) 14 and 16, the counter members (or jaws) 15 and 17 for the spreaders, the welding die 18, and the counter member 19 for the welding die.

The spreaders and their counter members, on the one hand, and the welding die and its counter member, on the other hand, are operated independently of the other by the common drive shaft 20. The vertical movement of the shaft controls the spreading jaws and the pivoting of the shaft the welding die and its counter member.

A collar 23a, prevented from moving axially by a set collar 21 and a lever 22 fixed on the drive shaft 20, transmits the vertical movements of the shaft 20 to an arm 23b, which controls, in the manner of a link, via the bushings 14a and 16a, the movement of the spreaders 14 and 16. When the arm 23b is lowered the spreaders 14 and 16 "close": that is, the spreader 14 pivots counterclockwise (as seen in FIG. 3), and the spreader 16 clockwise, about the axle 13, the downward movement of the arm 23b being transmitted through the bushings 14a, 16a to the spreaders. A rod 14c connects the bushing 14a to the spreader 14. The bushing 16a and spreader 16 can be connected together in any suitable and known way, such as also by a rod (not shown).

The spreader counter-member 15 and 17 are continuously urged by a spring 24 (shown only in FIG. 1) respectively in a clockwise and counterclockwise direction, as seen in FIG. 3. They are free to pivot under the influence of the spring bias only when the corresponding spreader 14 (for member 15) and 16 (for member 17) also pivots to close, because each member 15 and 17 has a respective finger 15a and 17a that rests on a respective stop 16b and 14b incorporated by the spreaders 16 and 14.

As shown most clearly in FIG. 6b, the projecting end of the container P incorporates two staggered notches 34 and 35, which enable a respective spreader to contact the inner surface of the respective opposed side of the container. Simultaneously, the respective counter members contact the outer surface directly opposite the respective spreaders, whereupon the two sides of the container are held clamped (FIG. 5b) under the force of the spring 24. A further lowering of the arm 23b causes the spreader 14 and counter member 15 to move further counterclockwise (as seen in FIG. 3) and the spreader 16 and counter member 17 further clockwise, until they occupy the positions shown in FIG. 6b, wherein the spreaders 14 and 16 are now on the sides of each other's starting positions. The counter members 15 and 17, however, are thereby forced to pivot against the spring bias, causing the fingers 15a and 17a to be raised off of the stops 16b and 14b. As shown in FIG. 6b, the two sides of the container, clamped between the spreaders and counter members, are spread apart to provide an opening through which the gas can ingress.

The operation of the welding die 18 and counter member 19, which are continuously biased to close by a spring 25 (shown only in FIG. 1), is clear from FIG. 3. The welding die and counter member are prevented from closing by a rod 26, which is under tension, and a rod 27 which is under compression. However, when the drive shaft 20 turns counterclockwise (FIG. 3), as determined by the cam surface 33, the die 18 and member 19 are free to pivot shut under the influence of the spring bias, since the rotation of the shaft 20 is transmitted to the rods 26 and 27 via the lever 22.

Figure 2:
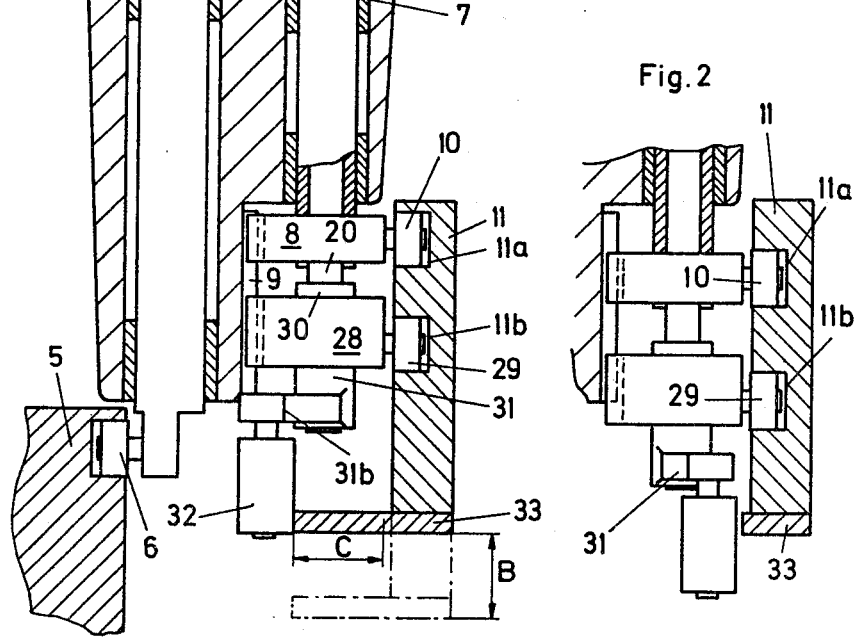
FIG. 2 is a part of FIG. 1, with the drive members for the spreaders, welding die, and associated counter members in positions different from those shown in FIG. 1.

FIG. 2 shows the drive members in positions different from those illustrated in FIG. 1. The position of wheel 10 corresponds to a downward movement of the welding head 12 through a distance A (FIG. 1). The position of wheel 29 corresponds to the positions of the spreaders and their counter members as illustrated in FIG. 7a. The cam surface 33 has retreated a distance C (FIG. 1). The drive shaft 20 is free to pivot under the force of the spring 25 only until the welding die 18 and counter member 19 bear against the projecting end of the container P. Consequently, there is a clearance between the cam surface 33 and the bushings 32 during the welding operation, as seen in FIG. 2.

FIGS. 4a to 7a show the successive operating positions of the important parts. To preserve the simplicity and clarity of the figures, only one spreader (14) and its counter member (15) are illustrated. The finger 17a of the counter member 17 is shown, as well as the welding die 18 and counter member 19, but not their lever 22.

FIGS. 4b to 7b are perspective views of the projecting end of the container and of the two spreaders with their associated counter members, and show the operating positions of these parts corresponding to the positions shown in FIGS. 4a to 7a. In FIGS. 4b to 7b it is assumed that the container P previously has been welded partly shut outside of the chamber formed by the hood 4 and turntable 1.

FIGS. 4a and 4b illustrate the positions of the parts after the welding head 12 has moved downwards the distance A. The spreaders, and associated counter members, and the welding die and its counter member have not moved with respect to the welding head.

FIGS. 5a and 5b show the sides of the container grasped by the spreaders 14 and 16 and the counter members 15 and 17.

FIGS. 6a and 6b illustrate the container's sides spread apart to form a mouth through which the gas can enter the container. FIG. 6a shows how the finger 17a of the counter member 17 has been raised off of the stop on spreader 14, because the member 17 has been pivoted, by the spreader 16, against the force of the spring 24.

During the step of welding, shown in FIGS. 7a and 7b, the container's sides are closed together.

As determined by the cam track 11b and the cam surface 33, the spreaders, the welding die, and the associated counter members return to their positions illustrated in FIG. 4a. The welding head 12 and hood 4 are then caused to rise by respective cam tracks 11a and 5, and the container P is removed.

The spreaders, welding die, and associated counter members can be adjusted to containers of various heights by vertically moving the cam track carrier 11 through a suitable distance B.

Although the preferred embodiment of the invention has been described, the scope of, and the breadth of protection afforded, the invention are limited solely by the appended claims.

We claim:

1. Device for evacuating of gas and/or filling with a protective gas and for closing upright, filled bag-like containers, made of a material that can be welded shut, in a chamber that can be evacuated and filled with the protective gas, said chamber being formed of a hood that is raised and lowered above a turntable, whereby when lowered it forms a gas-tight chamber with the turntable and contains a heated welding die and counter member mounted on a vertically movable holder, for sealing the container shut after it has been filled with gas, and including a plurality of means mounted on said holder for spreading apart the sides of the container and holding the same open while being filled with the gas.

2. The device as defined in claim 1, including a cam track and means running in said cam track as the turntable turns and connected to the hood, for raising and lowering the latter in response to the rotation of the turntable.

3. The device as defined in claim 1, wherein said plurality of means comprises two spreader means and an associated counter member means for each said spreader means, each said spreader means and associated counter member means grasping between them a respective opposed side of the container and spreading apart the sides thus grasped.

4. The device as defined in claim 3, including a vertical drive shaft movable between an upper and a lower position for causing each said spreader means and associated counter member means to grasp a respective side of the container and then to spread apart the two sides grasped; and means for moving said drive shaft between said upper and lower positions independently of the movement of the hood.

5. The device as defined in claim 4, wherein said means for moving said drive shaft between upper and lower positions comprises a cam track and means connected to said drive shaft and running in said cam track when the turntable rotates.

6. The device as defined in claim 5, including an arm (23b) connected to said drive shaft at the upper end thereof and moving vertically therewith, and means coupling said arm to each said spreader means and associated counter member means.

7. The device as defined in claim 6, including an axle mounted on the vertically movable holder, each said spreader means and associated counter member means being mounted on said axle to rotate thereabout, said arm and coupling means transforming the vertical movements of said drive shaft into pivotal movements of each said spreader means and associated counter member means about said shaft, whereby a spreader means and its associated counter member means are first caused to pivot in opposite senses and to shut upon one another and then to pivot together in the same sense that the spreader means pivoted, said two spreader means pivoting in opposite senses.

8. The device as defined in claim 7, including first resilient means for biasing said two spreader means and associated counter member means to close, and means for preventing closure except when said drive shaft is lowered.

9. The device as defined in claim 7, wherein the welding die and associated counter member are mounted on said axle to pivot to open and to close, and wherein said drive shaft pivots between first and second positions for controlling the opening and closing of the welding die and associated counter member, and means for pivoting said drive shaft.

10. The device as defined in claim 9, wherein said means for pivoting said drive shaft includes second resilient means tending to cause the drive shaft to pivot; and a cam surface, and means connected to said drive shaft and running over said cam surface when the turntable rotates for controlling the pivoting of said drive shaft.

11. The device as defined in claim 10, including a lever connected to said drive shaft at the upper end thereof and pivoting therewith, a rod in tension and a rod in compression connecting said lever to the welding die and associated counter member, said second resilient means acting to close the welding die and associated counter member, which are held open by said two rods when said drive shaft is in said first position and are free to close when said drive shaft pivots to said second position.

12. The device as defined in claim 11, including a hollow vertical rod which contains said drive shaft and which mounts at its upper end the holder, said rod being movable independently of said drive shaft between upper and lower positions, and means for moving said rod between said positions.

13. The device as defined in claim 12, wherein said means for moving said rod comprises a cam track and means connected to said rod and running in said cam track when the turntable rotates.

14. The device as defined in claim 13, wherein said cam track for said rod and said cam track for said drive shaft are incorporated in a common carrier that is movable vertically to accommodate containers of different heights.

References Cited
UNITED STATES PATENTS 2,933,868   4/1960   Graefingholt _____ 53—112 X TRAVIS S. McGEHEE, Primary Examiner U.S. Cl. X.R.

53—112